US012562842B1

(12) United States Patent
Dai et al.

(10) Patent No.: US 12,562,842 B1
(45) Date of Patent: Feb. 24, 2026

(54) TRANSPORT BLOCK SCALING FOR PHYSICAL UPLINK SHARED CHANNEL REPETITION

(71) Applicant: QUALCOMM Incorporated, San Diego, CA (US)

(72) Inventors: Jing Dai, Beijing (CN); Chao Wei, Beijing (CN); Chenxi Hao, Beijing (CN); Min Huang, Beijing (CN); Qiaoyu Li, Beijing (CN); Wei Xi, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 18/040,101

(22) PCT Filed: Sep. 29, 2020

(86) PCT No.: PCT/CN2020/118757
§ 371 (c)(1),
(2) Date: Jan. 31, 2023

(87) PCT Pub. No.: WO2022/067483
PCT Pub. Date: Apr. 7, 2022

(51) Int. Cl.
H04B 1/713 (2011.01)
H04L 1/1607 (2023.01)
H04L 1/18 (2023.01)

(52) U.S. Cl.
CPC .............. H04L 1/18 (2013.01); H04L 1/1671 (2013.01)

(58) Field of Classification Search
CPC ......... H04B 1/713; H04B 1/7143; H04L 1/08; H04L 1/1812; H04L 27/2602;
(Continued)

(56) References Cited

U.S. PATENT DOCUMENTS

| | | | |
|---|---|---|---|
| 2020/0221478 A1 | 7/2020 | Fakoorian et al. | |
| 2020/0313793 A1* | 10/2020 | Jung ....................... | H04L 1/189 |

FOREIGN PATENT DOCUMENTS

| | | |
|---|---|---|
| CN | 111277361 A | 6/2020 |
| CN | 111436144 A | 7/2020 |
| WO | 2020067967 A1 | 4/2020 |

OTHER PUBLICATIONS

CATT: "Remaining Issues on PUSCH Enhancements", 3GPP TSG RAN WG1 #100bis, R1-2002084, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 10, 2020-Apr. 30, 2020, Apr. 11, 2020, XP051875441, 19 Pages, figure 2, section 2.1.

(Continued)

*Primary Examiner* — Mansour Oveissi
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may determine a transport block size based at least in part on a set of physical uplink shared channel resources corresponding to a set of physical uplink shared channel repetitions that are configured to be transmitted over at least one repetition unit comprising at least one nominal repetition and at least one actual repetition. The UE may transmit the set of physical uplink shared channel repetitions based at least in part on the transport block size. Numerous other aspects are provided.

30 Claims, 11 Drawing Sheets

(58) Field of Classification Search
CPC ....... H04L 5/001; H04L 5/003; H04L 5/0048;
H04L 5/0053; H04L 5/0094; H04W
28/06; H04W 28/065; H04W 72/0446;
H04W 72/1268; H04W 72/21; H04W
72/23; H04W 72/56; H04W 72/569
See application file for complete search history.

(56) References Cited

OTHER PUBLICATIONS

Ericsson: "PUSCH Enhancements for NR URLLC", 3GPP Draft, 3GPP TSG RAN WG1 Meeting #98bis, R1-1910547, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019, XP051809151, 22 Pages, Sections 3-4.
Supplementary European Search Report—EP20955511—Search Authority—The Hague—Mar. 27, 2024.
CATT: "Remaining Issues on PUSCH Enhancements", 3GPP TSG RAN WG1 #100bis, R1-2002084, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 10, 2020-Apr. 30, 2020, Apr. 11, 2020, 19 Pages.
ZTE: "PUSCH Enhancements for NR URLLC", 3GPP TSG RAN WG1 #97, R1-1906411, 3rd Generation Partnership Project, Mobile Competence Centre, 650, Route Des Lucioles, F-06921 Sophia-antipolis Cedex, France, vol. RAN WG1, No. Reno, USA, May 13, 2019-May 17, 2019, May 3, 2019, 8 Pages.
Apple Inc: "Remaining Issues on PUSCH Enhancements for eURLLC", 3GPP Draft, 3GPP TSG RAN WG1 #101-e, R1-2004223, e-Meeting, May 25-Jun. 5, 2020, pp. 1-12.
International Search Report and Written Opinion—PCT/CN2020/118757—ISA/EPO—Jun. 25, 2021.
OPPO: "PUSCH Enhancement for URLLC", 3GPP Draft, 3GPP TSG RAN WG1 #99, R1-1912520, Reno, USA, Nov. 18-22, 2019, 8 pages, Section 2.
ZTE: "PUSCH Enhancements for NR URLLC", 3GPP Draft, 3GPP TSG RAN WG1 #97, R1-1906411, Reno, USA, May 13-17, 2019, pp. 1-8, section 2 and 4.

* cited by examiner

300

UL 4-slot PUSCH

UE
305

Base
Station
310

700

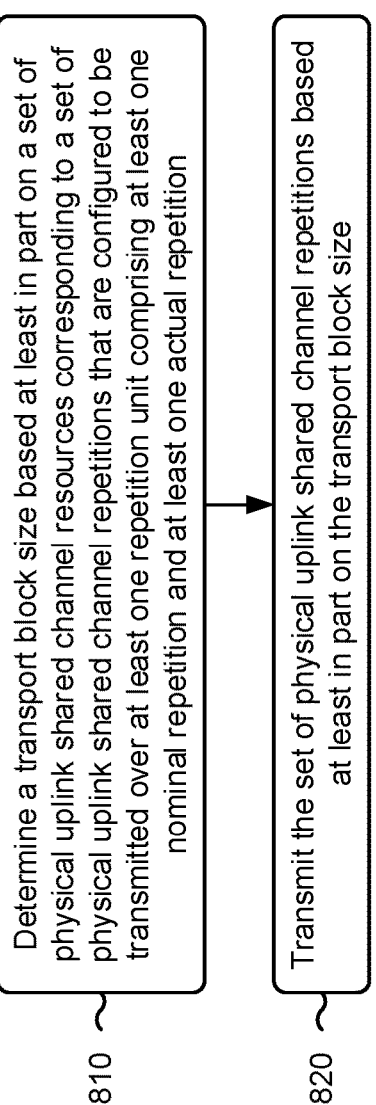

810 — Determine a transport block size based at least in part on a set of physical uplink shared channel resources corresponding to a set of physical uplink shared channel repetitions that are configured to be transmitted over at least one repetition unit comprising at least one nominal repetition and at least one actual repetition

820 — Transmit the set of physical uplink shared channel repetitions based at least in part on the transport block size

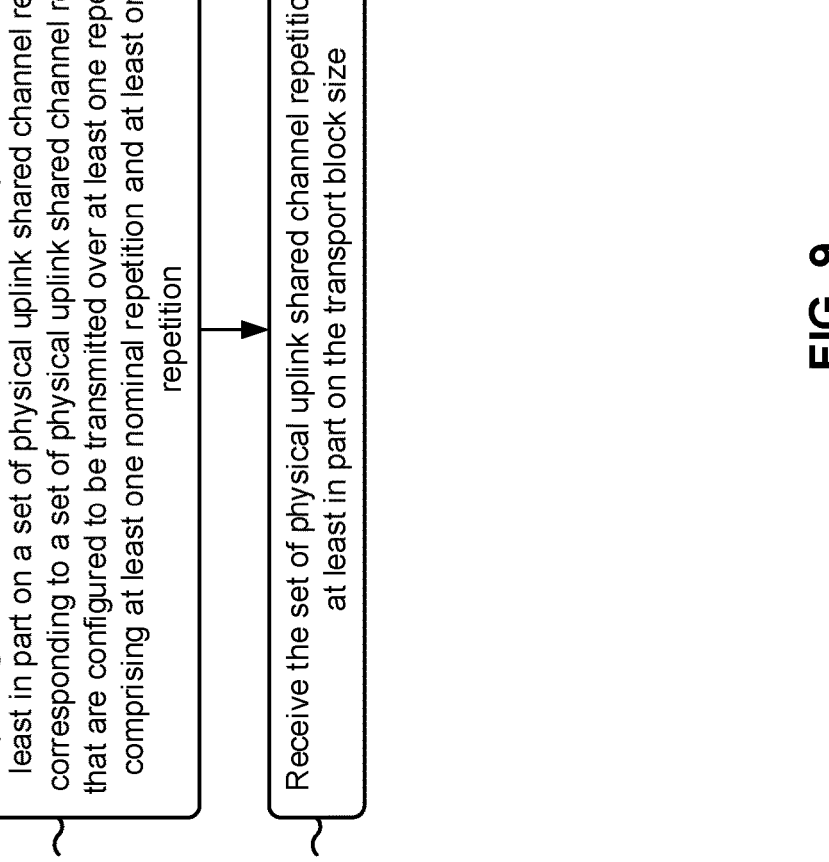

900

910

Transmit a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit comprising at least one nominal repetition and at least one actual repetition

920

Receive the set of physical uplink shared channel repetitions based at least in part on the transport block size

FIG. 9

TRANSPORT BLOCK SCALING FOR PHYSICAL UPLINK SHARED CHANNEL REPETITION

CROSS-REFERENCE TO RELATED APPLICATION

This Patent Application is a 371 national stage of PCT Application No. PCT/CN2020/118757 filed on Sep. 29, 2020, entitled "TRANSPORT BLOCK SCALING FOR PHYSICAL UPLINK SHARED CHANNEL REPETITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transport block scaling for physical uplink shared channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the memory and the one or more processors configured to determine a transport block size based at least in part on a set of physical uplink shared channel (PUSCH) resources corresponding to a set of PUSCH repetitions that are configured to be transmitted over at least one repetition unit comprising at least one nominal repetition and at least one actual repetition; and transmit the set of PUSCH repetitions based at least in part on the transport block size.

In some aspects, a base station for wireless communication includes a memory; and one or more processors coupled to the memory, the memory and the one or more processors configured to transmit a PUSCH repetition configuration comprising an indication to determine a transport block size based at least in part on a set of PUSCH resources corresponding to a set of PUSCH repetitions that are configured to be transmitted over at least one repetition unit comprising at least one nominal repetition and at least one actual repetition; and receive the set of PUSCH repetitions based at least in part on the transport block size.

In some aspects, a method of wireless communication performed by a UE includes determining a transport block size based at least in part on a set of PUSCH resources corresponding to a set of PUSCH repetitions that are configured to be transmitted over at least one repetition unit comprising at least one nominal repetition and at least one actual repetition; and transmitting the set of PUSCH repetitions based at least in part on the transport block size.

In some aspects, a method of wireless communication performed by a base station includes transmitting a PUSCH repetition configuration comprising an indication to determine a transport block size based at least in part on a set of PUSCH resources corresponding to a set of PUSCH repetitions that are configured to be transmitted over at least one repetition unit comprising at least one nominal repetition and at least one actual repetition; and receiving the set of PUSCH repetitions based at least in part on the transport block size.

In some aspects, a non-transitory computer-readable medium storing a set of instructions for wireless communication includes one or more instructions that, when executed by one or more processors of a UE, cause the UE to determine a transport block size based at least in part on a set of PUSCH resources corresponding to a set of PUSCH repetitions that are configured to be transmitted over at least one repetition unit comprising at least one nominal repetition and at least one actual repetition; and transmit the set of PUSCH repetitions based at least in part on the transport block size.

In some aspects, a non-transitory computer-readable medium storing a set of instructions for wireless communication includes one or more instructions that, when executed by one or more processors of a base station, cause the base station to transmit a PUSCH repetition configuration comprising an indication to determine a transport block size based at least in part on a set of PUSCH resources corresponding to a set of PUSCH repetitions that are configured to be transmitted over at least one repetition unit comprising at least one nominal repetition and at least one actual repetition; and receive the set of PUSCH repetitions based at least in part on the transport block size.

In some aspects, an apparatus for wireless communication includes means for determining a transport block size based at least in part on a set of PUSCH resources corresponding to a set of PUSCH repetitions that are configured to be transmitted over at least one repetition unit comprising at least one nominal repetition and at least one actual repetition; and means for transmitting the set of PUSCH repetitions based at least in part on the transport block size.

In some aspects, an apparatus for wireless communication includes means for transmitting a PUSCH repetition configuration comprising an indication to determine a transport block size based at least in part on a set of PUSCH resources corresponding to a set of PUSCH repetitions that are configured to be transmitted over at least one repetition unit comprising at least one nominal repetition and at least one actual repetition; and means for receiving the set of PUSCH repetitions based at least in part on the transport block size.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with transport block scaling for PUSCH repetition, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
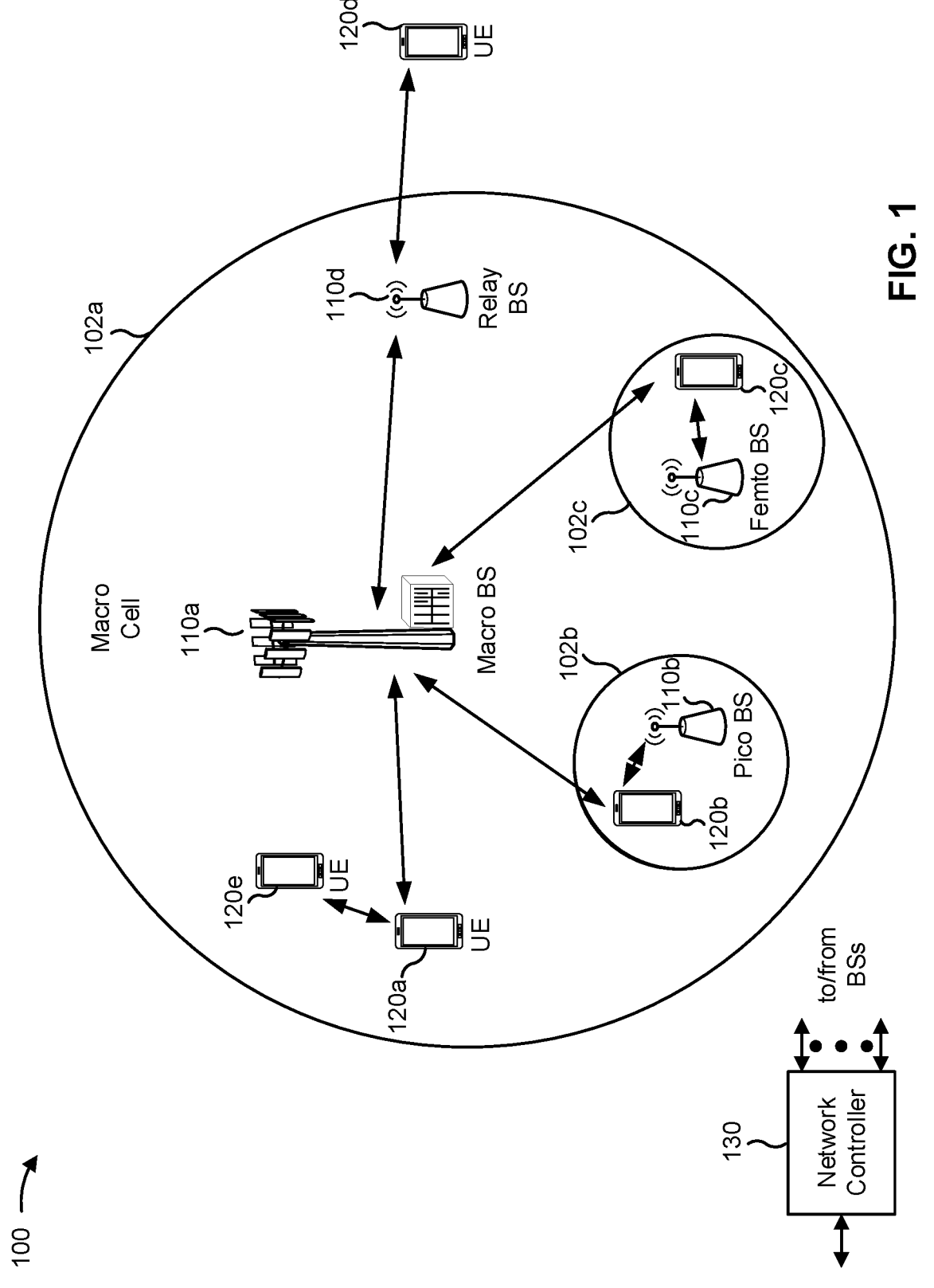
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
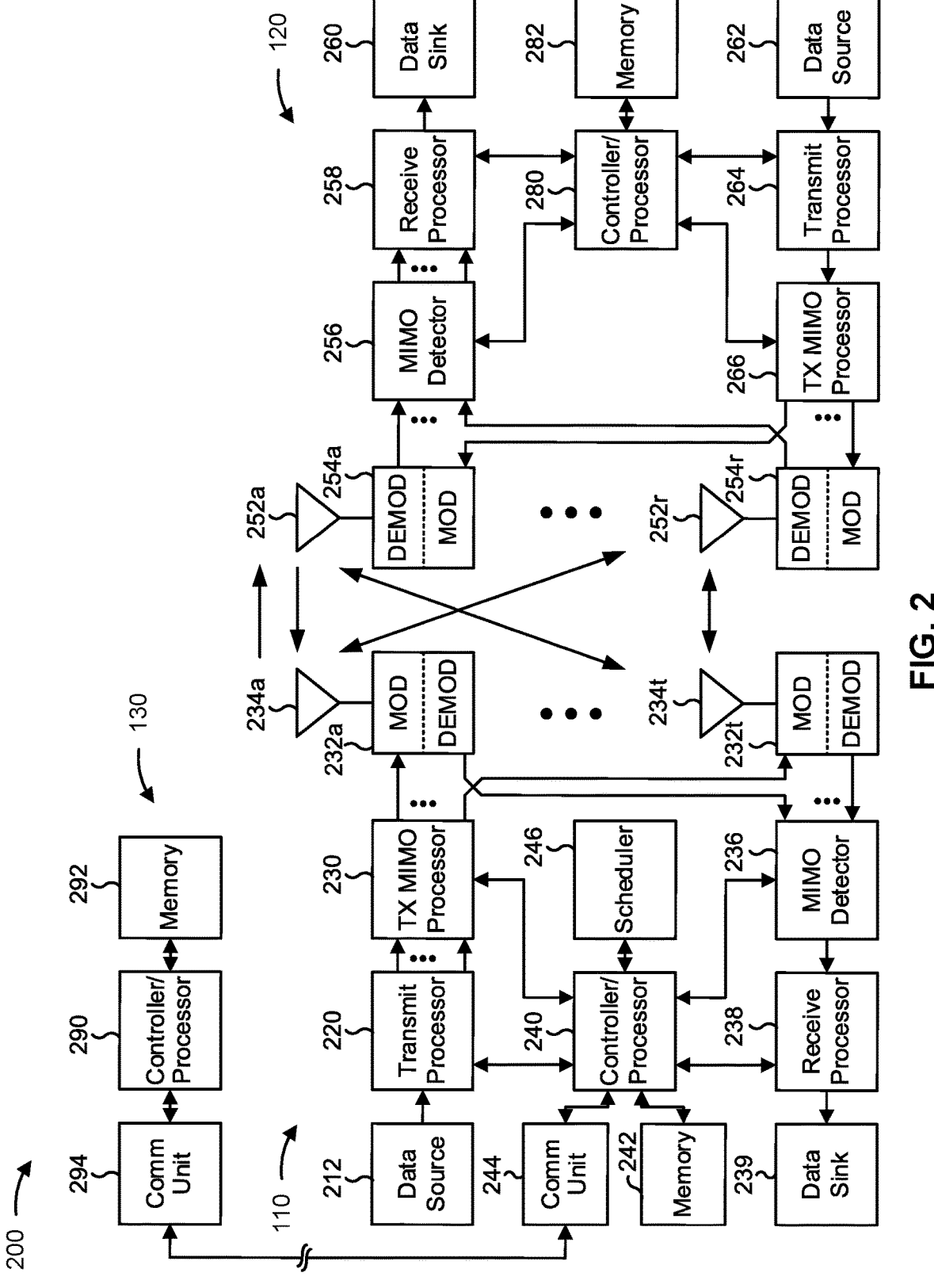
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-10.

Controller/processor 240 of base station 110, controller/processor 280 of UE 120, and/or any other component(s) of FIG. 2 may perform one or more techniques associated with transport block scaling for physical uplink shared channel (PUSCH) repetition, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for determining a transport block size based at least in part on a set of physical uplink shared channel resources corresponding to a set of physical uplink shared channel repetitions that are configured to be transmitted over at least one repetition unit comprising at least one nominal repetition and at least one actual repetition, means for transmitting the set of physical uplink shared channel repetitions based at least in part on the transport block size, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit comprising at least one nominal repetition and at least one actual repetition, means for receiving the set of physical uplink shared channel repetitions based at least in part on the transport block size, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
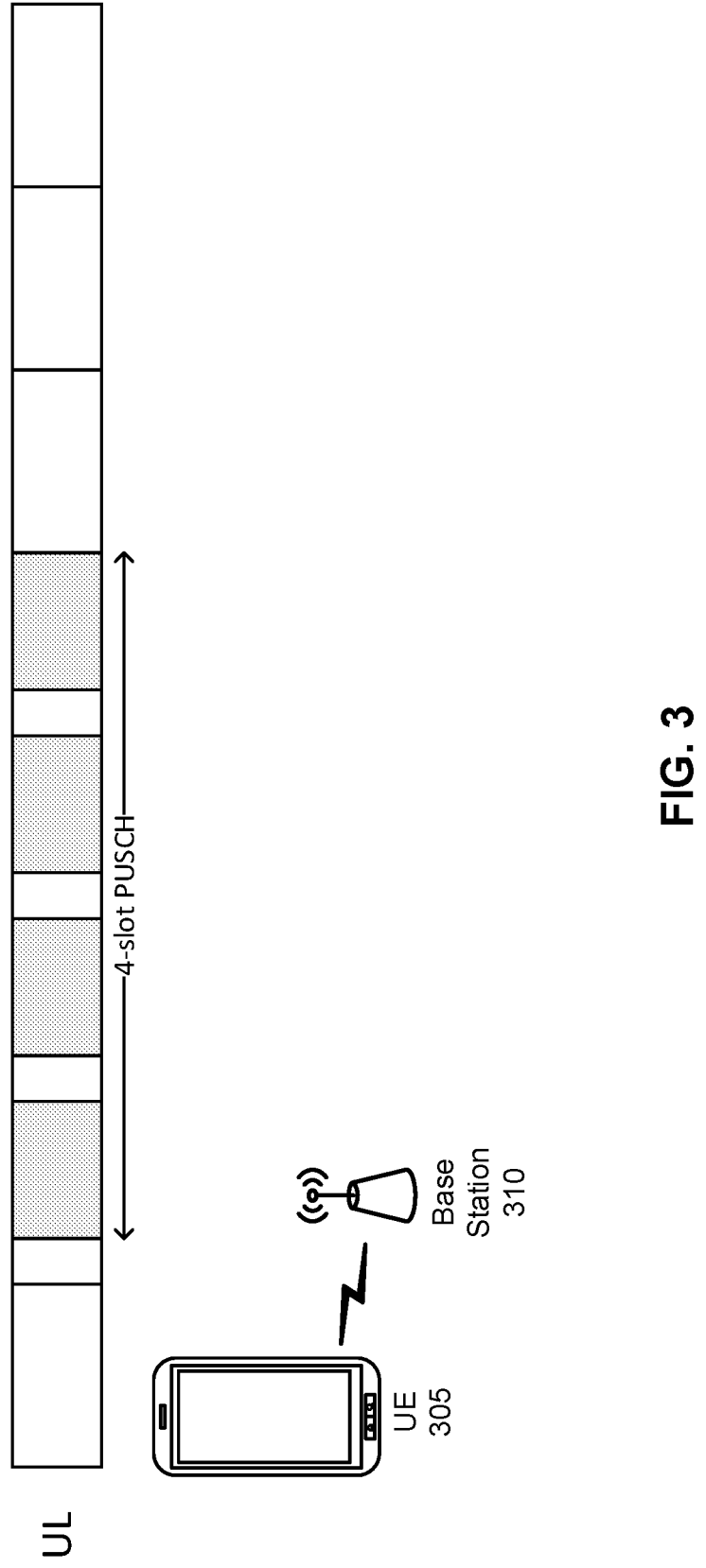
FIGS. 3-5 are diagrams illustrating examples of physical uplink shared channel (PUSCH) repetition, in accordance with various aspects of the present disclosure.

FIG. 3 is a diagram illustrating an example 300 of PUSCH repetition, in accordance with various aspects of the present disclosure. As shown in FIG. 3, a UE 305 and a base station 310 may communicate with one another. The UE 305 and the base station 310 may communicate with one another via a wireless network (e.g., the wireless network 100 shown in FIG. 1).

As shown, the UE 305 may repeat a transmission of a PUSCH communication over a number of slots. For example, as shown, the UE 305 may transmit a number of PUSCH repetitions over successive slots. As used herein, "repetition" refers to a communication that is transmitted more than one time and refers to the initial transmission of that communication or any subsequent retransmission of that communication. PUSCH repetition (which may be referred to, for example, as slot-repetition, slot-aggregation, and/or multi-slot PUSCH) may be used to increase a signal-to-noise ratio (SNR) to improve transmission reliability.

A modulation and coding scheme (MCS) and/or a resource allocation may be indicated in a scheduling downlink control information (DCI) transmission. The MCS and/or the resource allocation may be common over the successive slots. For each slot of the multi-slot PUSCH, a transmission block may be the same (because the same data is being retransmitted. The encoded bits between PUSCH repetitions may differ.

For example, the redundancy version (RV) of each slot may be different. The RV of the first slot may be indicated in a scheduling DCI, while the RV of the $n^{th}$ slot may be determined by 'n mod 4.' For example, for a first transmission of a 4-slot PUSCH, an RV order may be {RV0, RV2, RV3, RV1}. An RV order or a retransmission of a 4-slot PUSCH may be, for example, {RV3, RV1, RV0, RV2}.

As indicated above, FIG. 3 is provided as an example. Other examples may differ from what is described with regard to FIG. 3.

Figure 4:
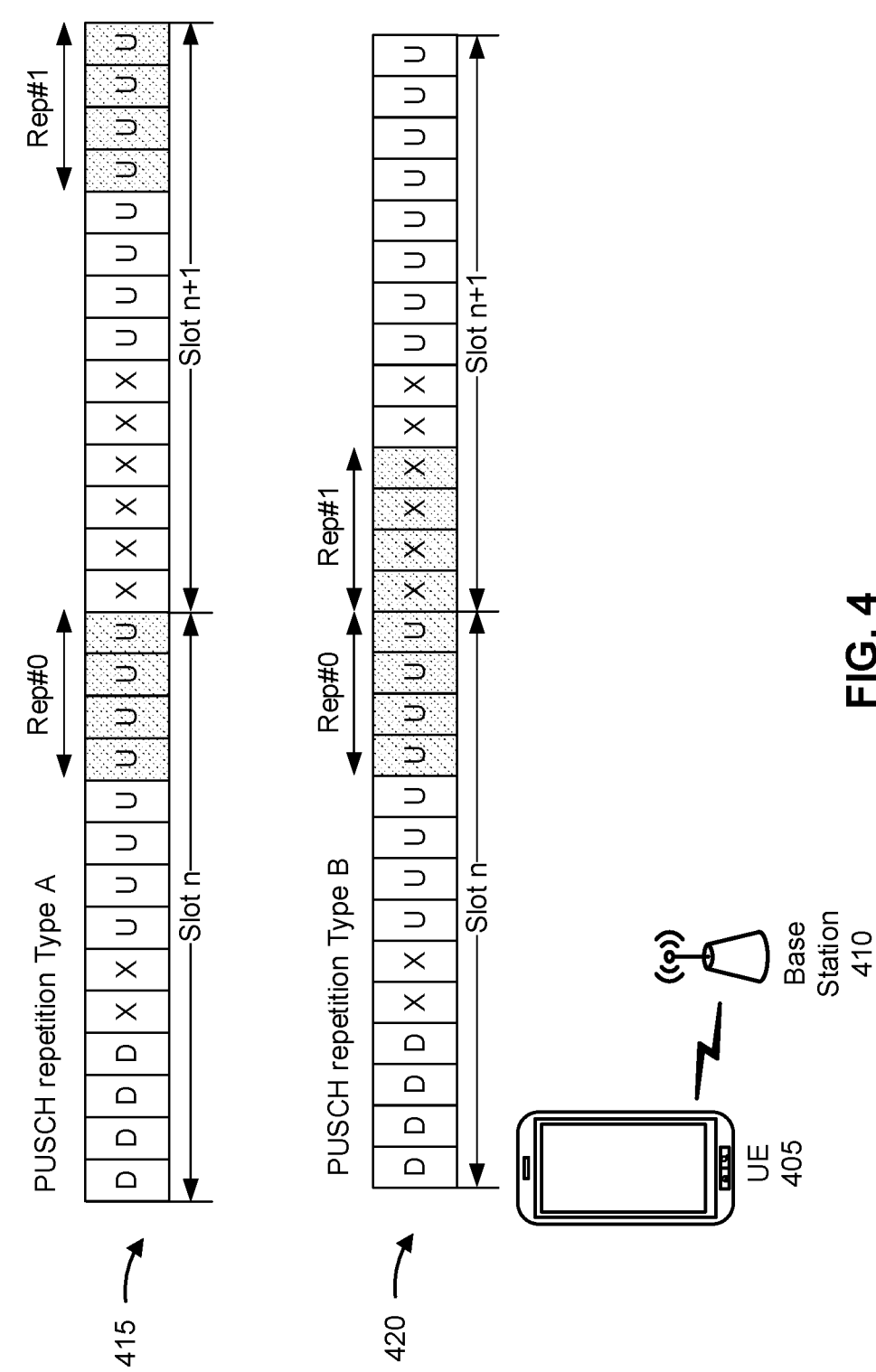

FIG. 4 is a diagram illustrating an example 400 of PUSCH repetition, in accordance with various aspects of the present disclosure. As shown in FIG. 4, a UE 405 and a base station 410 may communicate with one another. The UE 405 and the base station 410 may communicate with one another via a wireless network (e.g., the wireless network 100 shown in FIG. 1). The UE 405 may be, or be similar to, the UE 305 shown in FIG. 3, and the base station 410 may be, or be similar to, the base station 310 shown in FIG. 3.

As shown, the UE 405 may transmit PUSCH communications using a first type of PUSCH repetition (shown as "Type A") 415 in which each PUSCH repetition occurs within a different slot than each other PUSCH repetition. The UE 405 may transmit PUSCH communications using a second type of PUSCH repetition (shown as "Type B") 420. PUSCH repetition Type B may be used to reduce the transmission latency of a repeated PUSCH, by providing repetition with consecutive symbols rather than consecutive slots, as shown. The consecutive symbols can be within a slot, or across adjacent slots, as shown in FIG. 4. The number of nominal repetitions K (e.g. K=2 in the figure) can be dynamically indicated in downlink control information (DCI). The time-domain resource allocation of the first nominal repetition can be indicated in DCI as a starting symbol, S, and symbol length, L, (e.g. S=10, L=4). The symbol length refers to the number of symbols in a repetition.

Transport blocks transmitted in different transmission time intervals (TTIs) (e.g., slots, mini-slots, sets of symbols, and/or the like) may be associated with different parameters used to determine respective transport block sizes of those transport blocks. A parameter used to determine a size of a transport block may be referred to as a transport block size determination parameter, and may include, for example, an MCS used for the transport block, a number of resource elements allocated for the transport block, a number of layers to be used to transmit the transport block, and/or the like. When different transport blocks are transmitted in different TTIs and/or by different base stations 410, those transport blocks may have different transport block sizes if those transport blocks are associated with different transport block size determination parameters.

In a typical case, transport block size may be determined with PUSCH resources of a single slot, even in the case of PUSCH repetition. For example, transport block size may be determined in accordance with the relationship $TBS + L_{CRC} \approx N_{RE} \cdot R \cdot Q_m$, where R and $Q_m$ are code rate and modulation order indicated by MCS, respectively, and $N_{RE}$ is the total number of data resource elements of PUSCH in a single slot. Determining transport block size in this way can result in a very low effective code rate for a multi-slot PUSCH since the effective code rate, $R_{eff,multi-slot} = R/M$, where M is the number of slots.

However, for uplink limited coverage scenarios, where the transmit power of the UE 405 is a bottleneck, further lowering of an already-low effective code rate, $R_{eff}$, can be harmful to the transmission reliability and can increase consumption of resources and/or bandwidth. For example, a double bandwidth associated with half of an effective coding rate ($R_{eff}/2$) lowers the power spectrum density (PSD) by 3 dB for uplink with limited transmit power. SNR also is decreased by 3 dB. Although the combining gain of $R_{eff}/2$ may generally be 3 dB, the channel estimation loss due to the lower SNR makes this gain less than 3 dB.

As indicated above, FIG. 4 is provided as an example. Other examples may differ from what is described with regard to FIG. 4.

Figure 5:
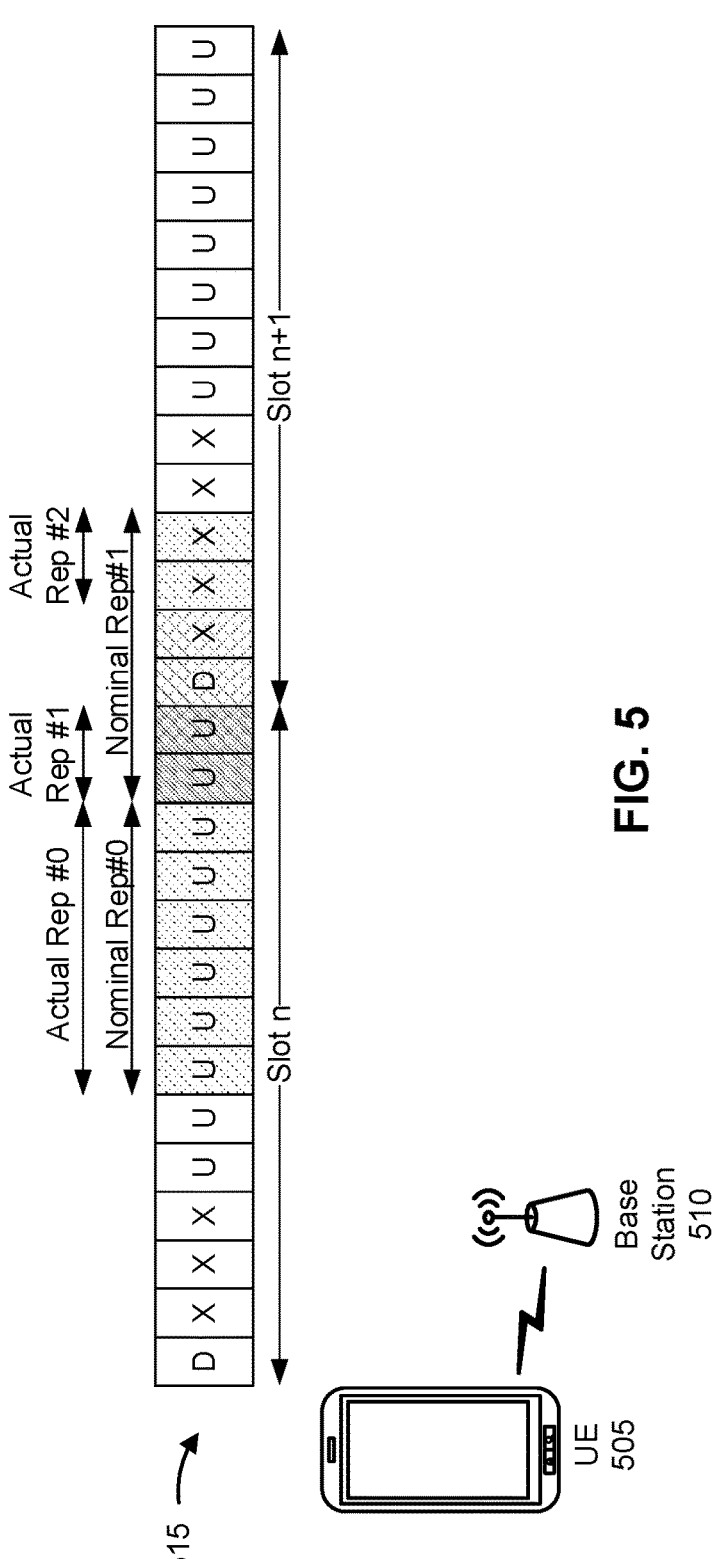

FIG. 5 is a diagram illustrating an example 500 associated with PUSCH repetitions, in accordance with various aspects of the present disclosure. As shown in FIG. 5, a UE 505 (e.g., similar to the UE 405 shown in FIG. 4) and a base station 410 (e.g., similar to the base station 410 shown in FIG. 4) may communicate with one another. The UE 505 and the base station 510 may communicate with one another via a wireless network (e.g., the wireless network 100 shown in FIG. 1). The UE 505 may be, or be similar to, the UE 120 shown in FIG. 1, and the base station 510 may be, or be similar to, the base station 110 shown in FIG. 1.

As shown by reference number 515, the UE 505 may transmit, and the base station 510 may receive, PUSCH repetitions in accordance with a Type B PUSCH repetition scheme. As shown, a nominal repetition can be segmented into multiple actual repetitions. For example, the nominal repetition may be segmented based on satisfaction of a segmentation condition. The segmentation condition may be satisfied, for example, when a nominal repetition crosses a slot boundary, when a nominal repetition includes one or more semi-static configured downlink symbols and/or invalid symbols, and/or the like. In some cases, a redundancy version (RV) of an nth actual repetition may be determined by the modulo of the index of the actual repetition with respect to the symbol length (n mod L).

In some cases, frequency hopping schemes can be configured for PUSCH repetition Type B. For example, inter-slot frequency hopping and/or inter-nominal repetition frequency hopping may be configured for PUSCH repetition Type B. Frequency hopping schemes with a hop including multiple slots (and thus multiple nominal repetitions) can also apply to PUSCH repetition Type B.

In some cases, in the context of PUSCH repetition Type B, transport block size may be determined based on the first nominal transmission and the nominal symbol length. PUSCH repetition Type B may involve the same challenges, as described above in connection with FIG. 4, that PUSCH repetition Type A involves regarding uplink limited coverage scenarios. Transport block size determination in PUSCH repetition Type B is based on one nominal repetition, which is at most 14-symbol long, or the length of a slot. Therefore, PUSCH repetition Type B without transport block size determination scaling up may negatively impact network performance.

According to some aspects of the techniques and apparatuses described herein, transport block size determination may be scaled up for use in PUSCH repetition scenarios. In some aspects, for example, the UE may determine a transport block size based at least in part on a set of PUSCH resources corresponding to a set of PUSCH repetitions that are configured to be transmitted over at least one repetition unit comprising at least one nominal repetition and at least one actual repetition. In this way, aspects facilitate a transport block size that can be scaled up with higher coding rate and lower bandwidth (associated with higher PSD) to improve coverage or transmission reliability. As a result, such aspects positively impact network performance.

As indicated above, FIG. 5 is provided as an example. Other examples may differ from what is described with regard to FIG. 5.

Figure 6:
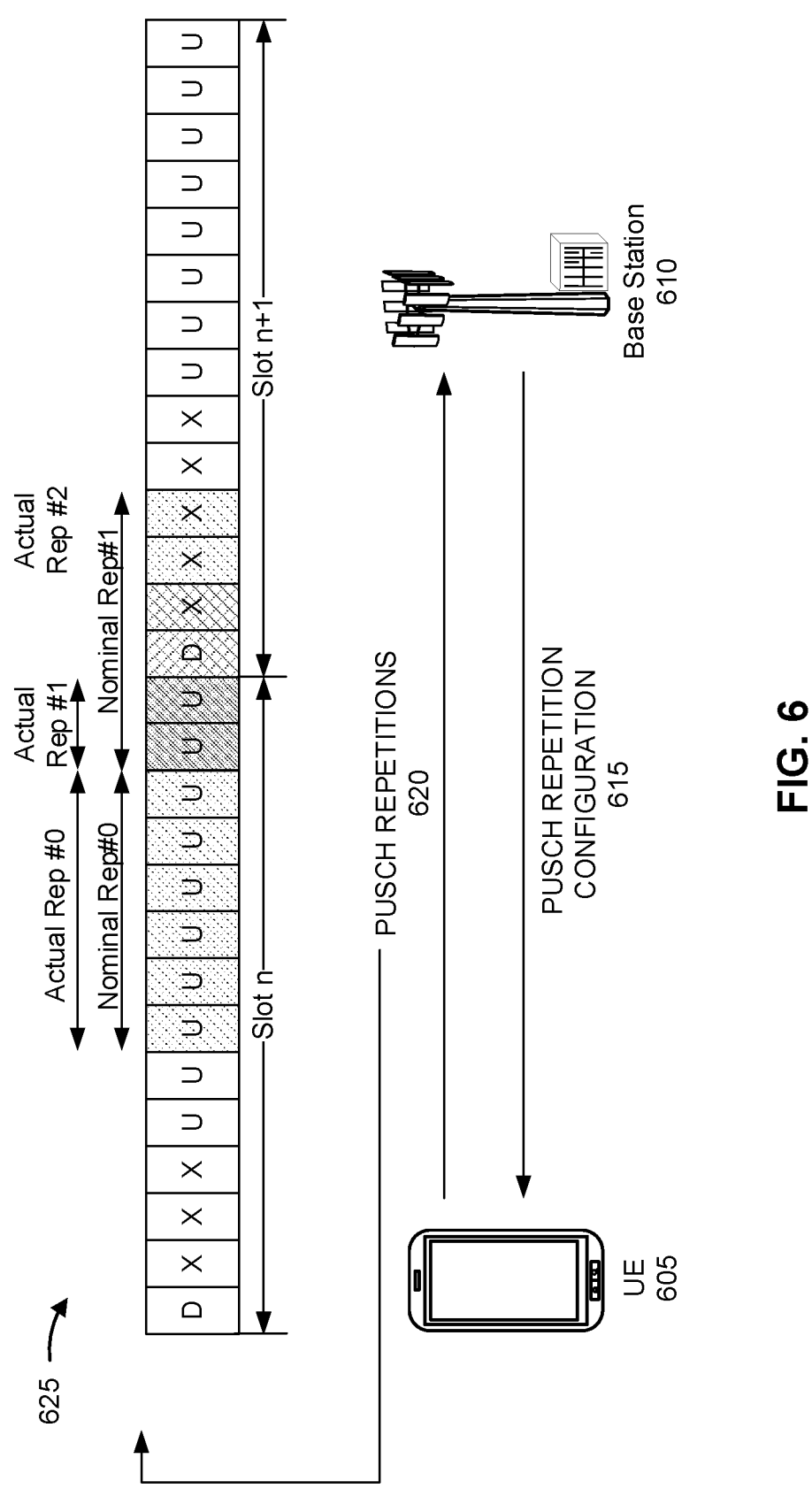
FIGS. 6 and 7 are diagrams illustrating examples associated with transport block scaling for PUSCH repetition, in accordance with various aspects of the present disclosure.

FIG. 6 is a diagram illustrating an example 600 associated with transport block scaling for PUSCH repetition, in accordance with various aspects of the present disclosure. As shown in FIG. 6, a UE 605 and a base station 610 may communicate with one another. The UE 605 and the base station 610 may communicate with one another via a wireless network (e.g., the wireless network 100 shown in FIG. 1). The UE 605 may be, or be similar to, the UE 505 shown in FIG. 5 and/or the UE 120 shown in FIG. 1. The base station 610 may be, or be similar to, the base station 510 shown in FIG. 5 and/or the base station 110 shown in FIG. 1.

As shown by reference number 615, the base station 610 may transmit, and the UE 605 may receive, a PUSCH repetition configuration. The PUSCH repetition configuration may include an indication to determine a transport block size based at least in part on a set of PUSCH resources corresponding to a set of PUSCH repetitions that are configured to be transmitted over at least one repetition unit comprising at least one nominal repetition and at least one actual repetition.

As shown by reference number 620, the UE 605 may transmit, and the base station 610 may receive, a set of PUSCH repetitions. The UE 605 may transmit the set of PUSCH communications based at least in part on the PUSCH repetition configuration. In some aspects, the UE 605 may use a PUSCH repetition scheme 625. The UE 605 may determine a transport block size based at least in part on a number of nominal resource elements of at least one initial nominal repetition of the at least one nominal repetition. For example, the number M of nominal repetitions may be an integer and M>1 (e.g. $TBS + L_{CRC} \approx M \cdot N_{RE} \cdot R \cdot Q_m$, where R and $Q_m$ are code rate and modulation order indicated by modulation and coding scheme (MCS) respectively, and $N_{RE}$ is the total number of data REs of the first nominal repetition). A quantity of the at least one initial nominal repetition is less than or equal to a quantity of the at least one nominal repetition. In some aspects, the UE 605 may determine the transport block size based at least in part on a number of actual resource elements corresponding to at least one initial nominal repetition of the at least one nominal repetition. A quantity of the at least one initial nominal repetition may be less than or equal to a quantity of the at least one nominal repetition.

In some aspects, the UE 605 may determine the transport block size based at least in part on a number of actual resource elements corresponding to at least one initial actual repetition of the at least one actual repetition. The UE 605 may transmit the set of PUSCH repetitions based at least in part on a frequency hopping pattern. The frequency hopping pattern may include an inter-nominal repetition frequency hop. A frequency hop length, X, may be equal to a nominal repetition count associated with the at least one repetition unit. The frequency hopping pattern may include an inter-nominal repetition frequency hop corresponding to a plurality of bundled slot units. A frequency hop length X is equal to an integer multiple of a nominal repetition count M associated with the at least one repetition unit.

In some aspects, the frequency hopping pattern may include an intra-nominal repetition frequency hop. A nominal repetition count M associated with the at least one repetition unit may be equal to an integer multiple of a frequency hop length X. In some aspects, the frequency hopping pattern may include two frequency locations, and the nominal repetition count M may be two times the frequency hop length X. The frequency hopping pattern may include more than two frequency locations, and the nominal repetition count is equal to a quantity of frequency hops in a frequency hop periodicity associated with the frequency hopping pattern. In some aspects, the frequency hopping pattern may include an inter-nominal repetition frequency hop.

A first demodulation reference signal pattern corresponding to a first repetition is different than a demodulation reference signal pattern corresponding to a second repetition. For example, in some aspects, one of the first repetition and the second repetition does not include a demodulation reference signal symbol. In some aspects, a mapping of encoded bits in the at least one repetition unit may be continuous. A starting bit of an initial actual repetition of at least one repetition unit may be based at least in part on a redundancy version, and a starting bit of an additional actual repetition of at least one repetition unit may include a next bit following a last bit in an immediately prior actual repetition.

The UE 605 may perform a two-level redundancy version cycle procedure. For example, the UE 605 may cycle a first actual repetition of each repetition unit of a plurality of repetition units as an outer level. The plurality of repetition units may include the repetition. The UE 605 may cycle a plurality of slots within the repetition unit as an inner level.

In some aspects, the base station 610 may transmit, and the UE 605 may receive a resource allocation that indicates a frequency domain resource that is smaller than a physical resource block. Further comprising modifying one or more parameters associated with the set of PUSCH repetitions based at least in part on the resource allocation, the one or more parameters comprising at least one of a nominal repetition count associated with a transport block size determination, a nominal repetition count, or a quantity of nominal repetitions bundled in a frequency hop.

As indicated above, FIG. 6 is provided as an example. Other examples may differ from what is described with regard to FIG. 6.

Figure 7:
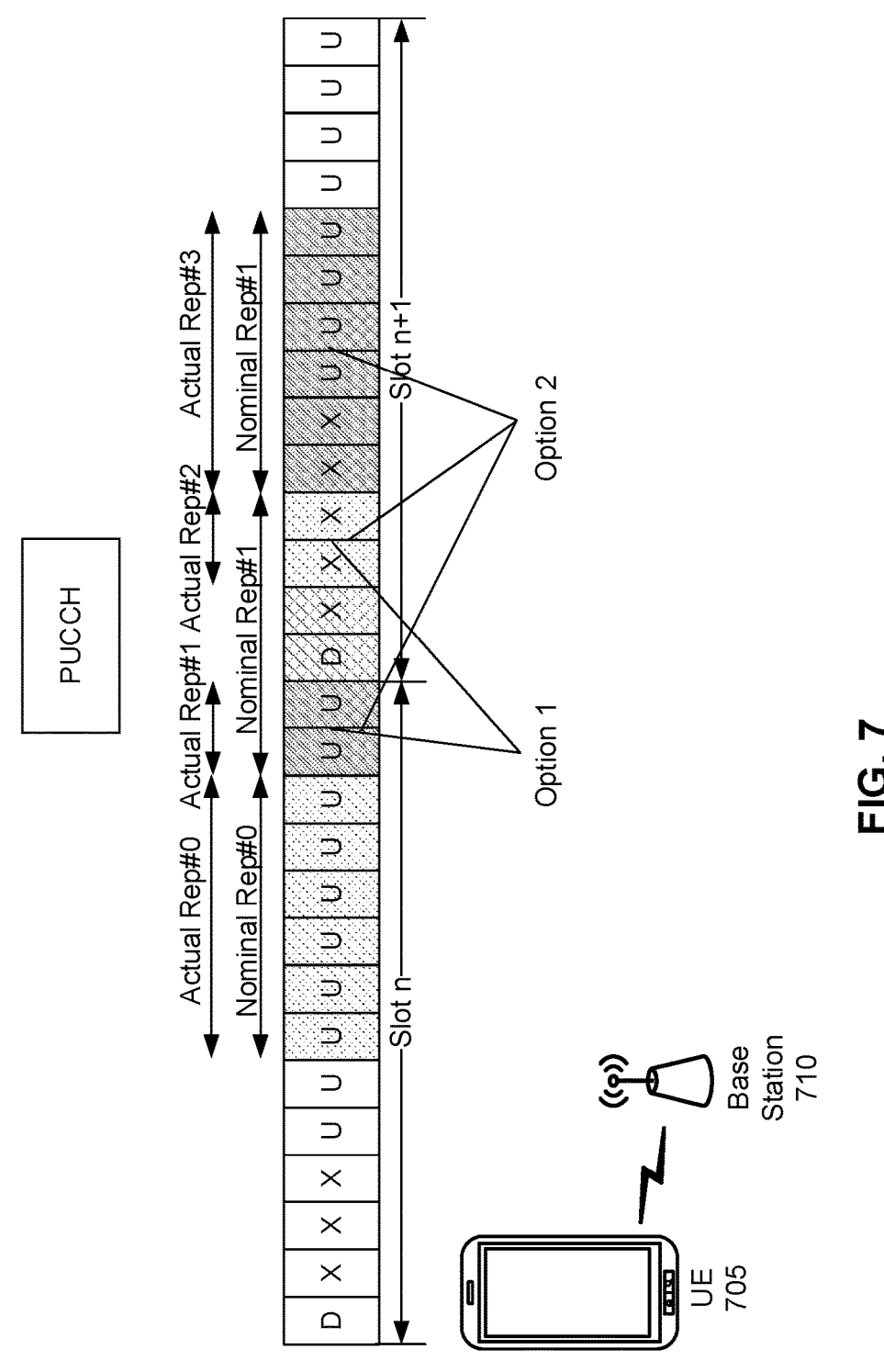

FIG. 7 is a diagram illustrating an example 700 associated with PUSCH repetition, in accordance with various aspects of the present disclosure. As shown in FIG. 7, a UE 705 and a base station 710 may communicate with one another. The UE 705 and the base station 710 may communicate with one another via a wireless network (e.g., the wireless network 100 shown in FIG. 1). The UE 705 may be, or be similar to, the UE 605 shown in FIG. 6, the UE 505 shown in FIG. 5 and/or the UE 120 shown in FIG. 1. The base station 610 may be, or be similar to, the base station 610 shown in FIG. 6, the base station 510 shown in FIG. 5 and/or the base station 110 shown in FIG. 1.

In some aspects, the UE 705 may multiplex uplink control information (UCI) on one or more PUSCH repetitions of the set of repetitions. A number of resource elements occupied by UCI on a PUSCH is scaled up by at least one of a number of nominal repetitions or a number of actual repetitions.

In some aspects, as indicated by "Option 1" multiplexing the UCI may include multiplexing the uplink control information on a first actual repetition of the at least one actual repetition that satisfies a multiplexing timeline. Multiplexing the UCI further comprises multiplexing the UCI on one or more additional consecutive actual repetitions of the at least one actual repetition. A quantity of the initial actual repetition and the one or more additional consecutive actual repetitions may be equal to a quantity of the set of PUSCH repetitions. In some aspects, the UE 605 may start from the first overlapping actual repetition that satisfies the multiplexing timeline. As shown by Option 2, the UE 605 may multiplex the UCI actual repetitions corresponding to the at least one nominal repetition.

As indicated above, FIG. 7 is provided as an example. Other examples may differ from what is described with regard to FIG. 7.

FIG. 8 is a diagram illustrating an example process 800 performed, for example, by a UE, in accordance with various aspects of the present disclosure. Example process 800 is an example where the UE (e.g., UE 120) performs operations associated with transport block scaling for PUSCH repetition.

As shown in FIG. 8, in some aspects, process 800 may include determining a transport block size based at least in part on a set of PUSCH resources corresponding to a set of PUSCH repetitions that are configured to be transmitted over at least one repetition unit comprising at least one nominal repetition and at least one actual repetition (block 810). For example, the UE (e.g., using communication manager 1004, depicted in FIG. 10) may determine a transport block size based at least in part on a set of PUSCH resources corresponding to a set of PUSCH repetitions that are configured to be transmitted over at least one repetition unit comprising at least one nominal repetition and at least one actual repetition, as described above.

As further shown in FIG. 8, in some aspects, process 800 may include transmitting the set of PUSCH repetitions based at least in part on the transport block size (block 820). For example, the UE (e.g., using transmission component 1006, depicted in FIG. 10) may transmit the set of PUSCH repetitions based at least in part on the transport block size, as described above.

Process 800 may include additional aspects, such as any single aspect or any combination of aspects described below and/or in connection with one or more other processes described elsewhere herein.

With respect to process 800, in some aspects, determining the transport block size comprises determining the transport block size based at least in part on a number of nominal resource elements of at least one initial nominal repetition of the at least one nominal repetition.

With respect to process 800, in some aspects, a quantity of the at least one initial nominal repetition is less than or equal to a quantity of the at least one nominal repetition.

With respect to process 800, in some aspects, determining the transport block size comprises determining the transport block size based at least in part on a number of actual resource elements corresponding to at least one initial nominal repetition of the at least one nominal repetition.

With respect to process 800, in some aspects, a quantity of the at least one initial nominal repetition is less than or equal to a quantity of the at least one nominal repetition.

With respect to process 800, in some aspects, determining the transport block size comprises determining the transport block size based at least in part on a number of actual resource elements corresponding to at least one initial actual repetition of the at least one actual repetition.

In some aspects, process 800 includes multiplexing uplink control information on one or more physical uplink shared channel repetitions of the set of physical uplink shared channel repetitions.

With respect to process 800, in some aspects, a number of resource elements occupied by uplink control information on a physical uplink shared channel is scaled up by at least one of a number of nominal repetitions or a number of actual repetitions.

With respect to process 800, in some aspects, multiplexing the uplink control information comprises multiplexing the uplink control information on a first actual repetition of the at least one actual repetition that satisfies a multiplexing timeline.

With respect to process 800, in some aspects, multiplexing the uplink control information further comprises multiplexing the uplink control information on one or more additional consecutive actual repetitions of the at least one actual repetition, wherein a quantity of the initial actual repetition and the one or more additional consecutive actual repetitions is equal to a quantity of the set of physical uplink shared channel repetitions.

With respect to process 800, in some aspects, multiplexing the uplink control information further comprises multiplexing the uplink control information on one or more additional consecutive actual repetitions corresponding to the at least one nominal repetition.

With respect to process 800, in some aspects, transmitting the set of physical uplink shared channel repetitions comprises transmitting the set of physical uplink shared channel repetitions based at least in part on a frequency hopping pattern.

With respect to process 800, in some aspects, the frequency hopping pattern comprises an inter-nominal repetition frequency hop, and wherein a frequency hop length is equal to a nominal repetition count associated with the at least one repetition unit.

With respect to process 800, in some aspects, the frequency hopping pattern comprises an inter-nominal repetition frequency hop corresponding to a plurality of bundled slot units, wherein a frequency hop length is equal to an integer multiple of a nominal repetition count associated with the at least one repetition unit.

With respect to process 800, in some aspects, the frequency hopping pattern comprises an intra-nominal repetition frequency hop, and wherein a nominal repetition count associated with the at least one repetition unit is equal to an integer multiple of a frequency hop length.

With respect to process 800, in some aspects, the frequency hopping pattern comprises two frequency locations, and wherein the nominal repetition count is two times the frequency hop length.

With respect to process 800, in some aspects, the frequency hopping pattern comprises more than two frequency locations, and wherein the nominal repetition count is equal to a quantity of frequency hops in a frequency hop periodicity associated with the frequency hopping pattern.

With respect to process 800, in some aspects, the frequency hopping pattern comprises an inter-nominal repetition frequency hop, and wherein a first demodulation reference signal pattern corresponding to a first repetition is different than a demodulation reference signal pattern corresponding to a second repetition.

With respect to process 800, in some aspects, one of the first repetition and the second repetition does not include a demodulation reference signal symbol.

With respect to process 800, in some aspects, a mapping of encoded bits in the at least one repetition unit is continuous.

With respect to process 800, in some aspects, a starting bit of an initial actual repetition of at least one repetition unit is based at least in part on a redundancy version, and wherein a starting bit of an additional actual repetition of at least one repetition unit comprises a next bit following a last bit in an immediately prior actual repetition.

With respect to process 800, in some aspects, transmitting the set of physical uplink shared channel repetitions comprises performing a two-level redundancy version cycle procedure.

With respect to process 800, in some aspects, performing the two-level redundancy version cycle procedure comprises cycling a first actual repetition of each repetition unit of a plurality of repetition units as an outer level, wherein the plurality of repetition units include the repetition, and cycling a plurality of actual repetitions within the repetition unit as an inner level.

In some aspects, process 800 includes receiving a resource allocation that indicates a frequency domain resource that is smaller than a physical resource block.

In some aspects, process 800 includes modifying one or more parameters associated with the set of physical uplink shared channel repetitions based at least in part on the resource allocation, the one or more parameters comprising at least one of a nominal repetition count associated with a transport block size determination, a nominal repetition count, or a quantity of nominal repetitions bundled in a frequency hop.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where the base station (e.g., base station 110) performs operations associated with transport block scaling for PUSCH repetition.

As shown in FIG. 9, in some aspects, process 900 may include transmitting a physical uplink shared channel repetition configuration comprising an indication to determine a transport block size based at least in part on a set of PUSCH resources corresponding to a set of PUSCH repetitions that are configured to be transmitted over at least one repetition unit comprising at least one nominal repetition and at least one actual repetition (block 910). For example, the base station (e.g., using transmission component 1106, depicted in FIG. 11) may transmit a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit comprising at least one nominal repetition and at least one actual repetition, as described above.

As further shown in FIG. 9, in some aspects, process 900 may include receiving the set of physical uplink shared channel repetitions based at least in part on the transport block size (block 920). For example, the base station (e.g., using reception component 1102, depicted in FIG. 11) may receive the set of physical uplink shared channel repetitions based at least in part on the transport block size, as described above.

Process 900 may include additional aspects, such as any single aspect or any combination of aspects described below and/or in connection with one or more other processes described elsewhere herein.

With respect to process 900, in some aspects, a determination of the transport block size comprises a determination of the transport block size based at least in part on a number of nominal resource elements of at least one initial nominal repetition of the at least one nominal repetition.

With respect to process 900, in some aspects, a quantity of the at least one initial nominal repetition is less than or equal to a quantity of the at least one nominal repetition.

With respect to process 900, in some aspects, a determination of the transport block size comprises a determination of the transport block size based at least in part on a number of actual resource elements corresponding to at least one initial nominal repetition of the at least one nominal repetition.

With respect to process 900, in some aspects, a quantity of the at least one initial nominal repetition is less than or equal to a quantity of the at least one nominal repetition.

With respect to process 900, in some aspects, a determination of the transport block size comprises a determination of the transport block size based at least in part on a number of actual resource elements corresponding to at least one initial actual repetition of the at least one actual repetition.

In some aspects, process 900 includes receiving uplink control information that is multiplexed on one or more physical uplink shared channel repetitions of the set of physical uplink shared channel repetitions.

With respect to process 900, in some aspects, a number of resource elements occupied by uplink control information on a physical uplink shared channel is scaled up by at least one of a number of nominal repetitions or a number of actual repetitions.

With respect to process 900, in some aspects, the uplink control information is multiplexed on a first actual repetition of the at least one actual repetition that satisfies a multiplexing timeline.

With respect to process 900, in some aspects, the uplink control information is multiplexed on one or more additional consecutive actual repetitions of the at least one actual repetition, wherein a quantity of the initial actual repetition and the one or more additional consecutive actual repetitions is equal to a quantity of the set of physical uplink shared channel repetitions.

With respect to process 900, in some aspects, the uplink control information is multiplexed on one or more additional consecutive actual repetitions corresponding to the at least one nominal repetition.

With respect to process 900, in some aspects, receiving the set of physical uplink shared channel repetitions comprises receiving the set of physical uplink shared channel repetitions based at least in part on a frequency hopping pattern.

With respect to process 900, in some aspects, the frequency hopping pattern comprises an inter-nominal repetition frequency hop, and wherein a frequency hop length is equal to a nominal repetition count associated with the at least one repetition unit.

With respect to process 900, in some aspects, the frequency hopping pattern comprises an inter-nominal repetition frequency hop corresponding to a plurality of bundled slot units, wherein a frequency hop length is equal to an integer multiple of a nominal repetition count associated with the at least one repetition unit.

With respect to process 900, in some aspects, the frequency hopping pattern comprises an intra-nominal repetition frequency hop, and wherein a nominal repetition count associated with the at least one repetition unit is equal to an integer multiple of a frequency hop length.

With respect to process 900, in some aspects, the frequency hopping pattern comprises two frequency locations, and wherein the nominal repetition count is two times the frequency hop length.

With respect to process 900, in some aspects, the frequency hopping pattern comprises more than two frequency locations, and wherein the nominal repetition count is equal to a quantity of frequency hops in a frequency hop periodicity associated with the frequency hopping pattern.

With respect to process 900, in some aspects, the frequency hopping pattern comprises an inter-nominal repetition frequency hop, and wherein a first demodulation reference signal pattern corresponding to a first repetition is different than a demodulation reference signal pattern corresponding to a second repetition.

With respect to process 900, in some aspects, one of the first repetition and the second repetition does not include a demodulation reference signal symbol.

With respect to process 900, in some aspects, a mapping of encoded bits in the at least one repetition unit is continuous.

With respect to process 900, in some aspects, a starting bit of an initial actual repetition of at least one repetition unit is based at least in part on a redundancy version, and wherein a starting bit of an additional actual repetition of at least one repetition unit comprises a next bit following a last bit in an immediately prior actual repetition.

With respect to process 900, in some aspects, receiving the set of physical uplink shared channel repetitions comprises receiving the set of physical uplink shared channel repetitions based at least in part on a two-level redundancy version cycle procedure.

With respect to process 900, in some aspects, the two-level redundancy version cycle procedure comprises a first cycle comprising a first actual repetition of each repetition unit of a plurality of repetition units cycled as an outer level, wherein the plurality of repetition units include the repetition, and a second cycle comprising a plurality of actual repetitions cycled within the repetition unit as an inner level.

In some aspects, process 900 includes transmitting a resource allocation that indicates a frequency domain resource that is smaller than a physical resource block.

With respect to process 900, in some aspects, one or more parameters associated with the set of physical uplink shared channel repetitions is modified based at least in part on the resource allocation, the one or more parameters comprising at least one of a nominal repetition count associated with a transport block size determination, a nominal repetition count, or a quantity of nominal repetitions bundled in a frequency hop.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
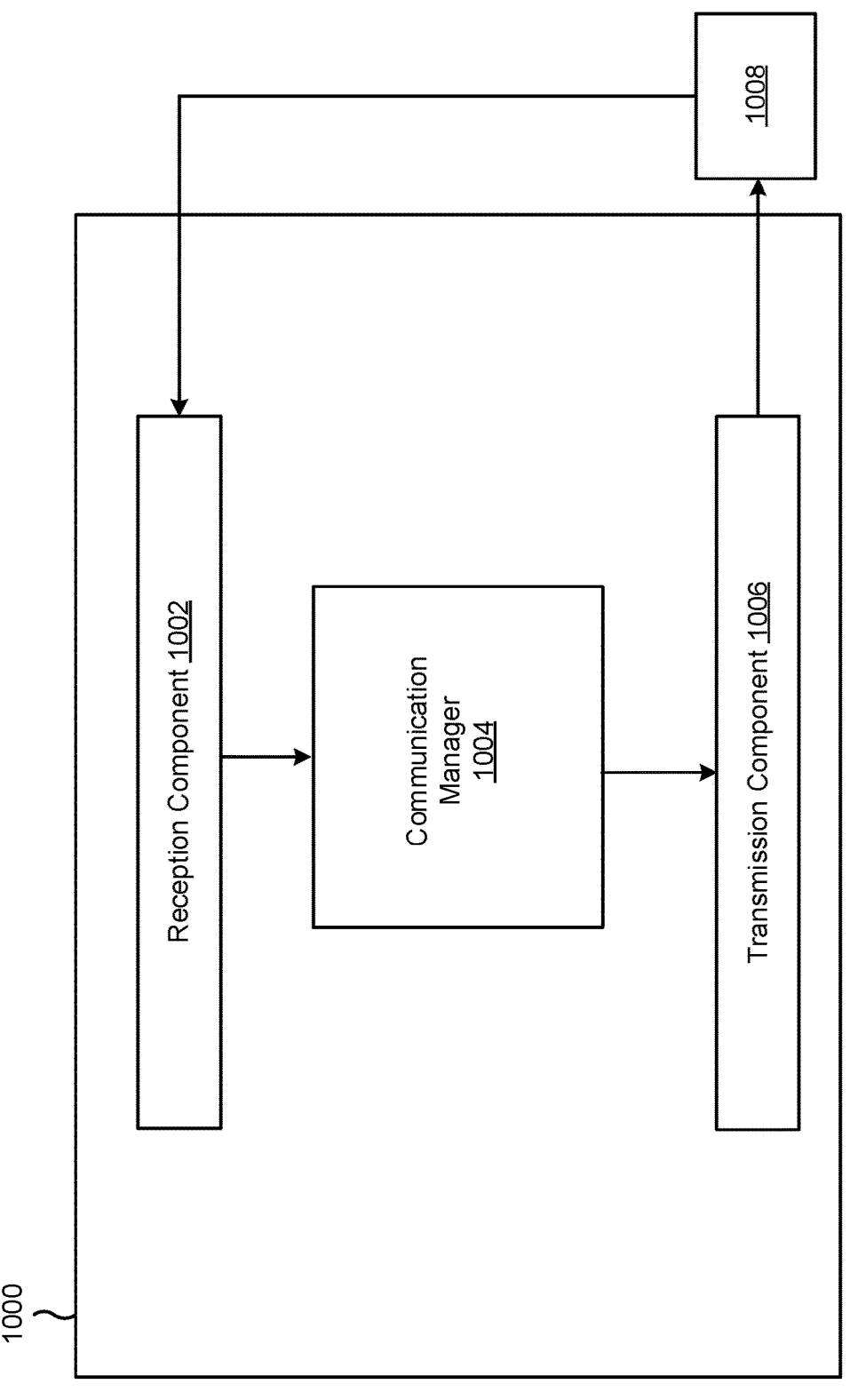
FIGS. 10 and 11 are block diagrams of example apparatuses for wireless communication, in accordance with various aspects of the present disclosure.

FIG. 10 is a block diagram of an example apparatus 1000 for wireless communication in accordance with various aspects of the present disclosure. The apparatus 1000 may be, be similar to, include, or be included in a UE (e.g., UE 605 shown in FIG. 6). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 may include one or more components of the first UE described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the first UE described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the first UE described above in connection with FIG. 2. In some aspects, the transmission component 1006 may be co-located with the reception component 1002 in a transceiver.

In some aspects, the communication manager 1004 may provide means for determining a transport block size based at least in part on a set of physical uplink shared channel resources corresponding to a set of physical uplink shared channel repetitions that are configured to be transmitted over at least one repetition unit comprising at least one nominal repetition and at least one actual repetition; and transmitting the set of physical uplink shared channel repetitions based at least in part on the transport block size. In some aspects, the communication manager 1004 may include a controller/processor, a memory, or a combination thereof, of the first UE described above in connection with FIG. 2. In some aspects, the communication manager 1004 may include the reception component 1002, the transmission component 1006, and/or the like. In some aspects, the means provided by the communication manager 1004 may include, or be included within, means provided by the reception component 1002, the transmission component 1004, and/or the like.

In some aspects, the communication manager 1004 and/or one or more components of the communication manager 1004 may include or may be implemented within hardware. In some aspects, the communication manager 1004 and/or one or more components thereof may include or may be implemented within a controller/processor, a memory, or a combination thereof, of the UE 120 described above in connection with FIG. 2.

In some aspects, the communication manager 1004 and/or one or more components of the communication manager 1004 may be implemented in code (e.g., as software or firmware stored in a memory). For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the UE 120 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
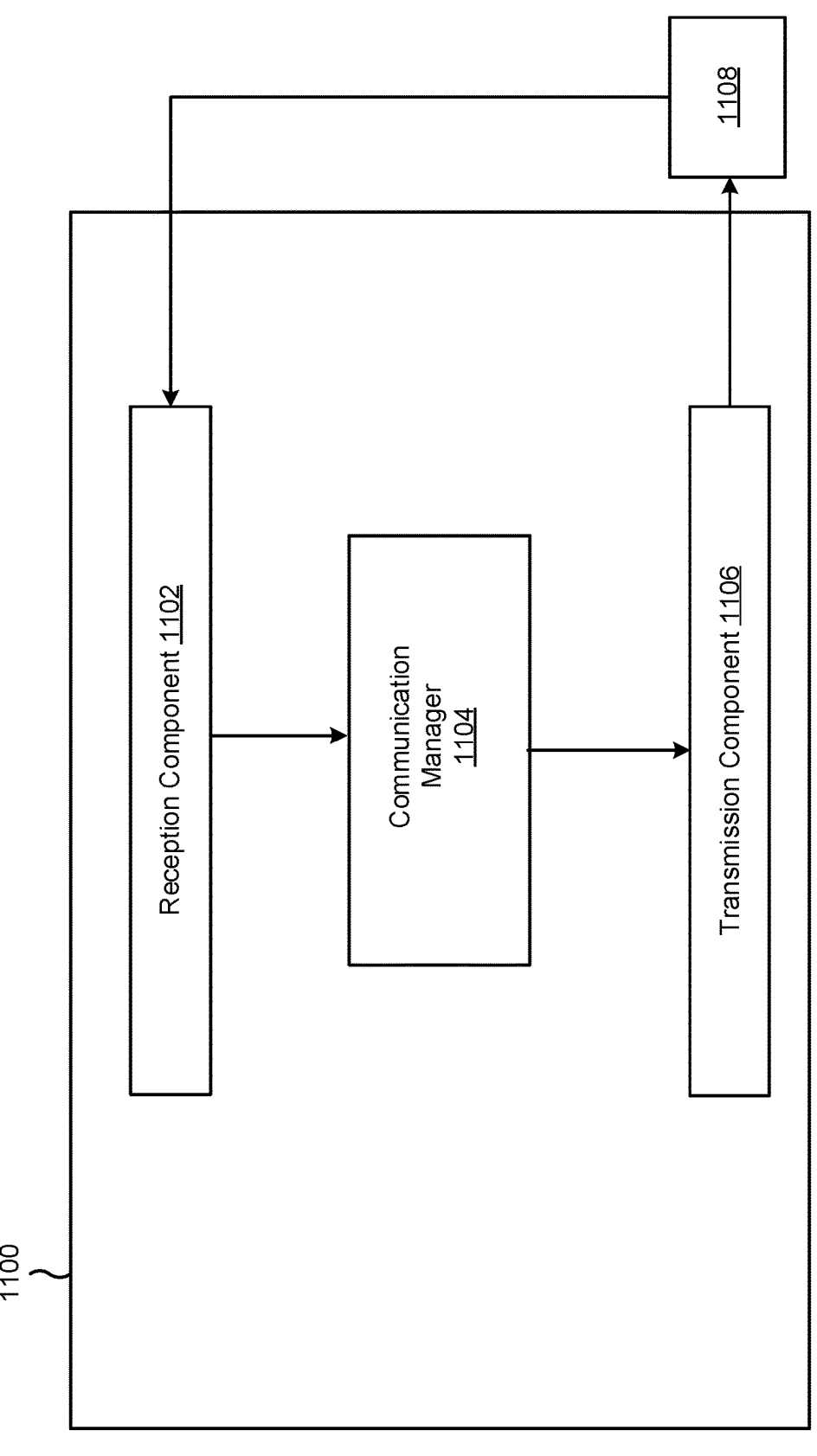

FIG. 11 is a block diagram of an example apparatus 1100 for wireless communication in accordance with various aspects of the present disclosure. The apparatus 1100 may be, be similar to, include, or be included in a base station (e.g., base station 610 shown in FIG. 6). In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a client, a server, a UE, a base station, or another wireless communication device) using the reception component 1102 and the transmission component 1106.

In some aspects, the apparatus 1100 may be configured to perform one or more operations described herein in connection with FIG. 6-7. Additionally, or alternatively, the apparatus 1000 may be configured to perform one or more processes described herein, such as process 900 of FIG. 9. In some aspects, the apparatus 1100 may include one or more components of the base station described above in connection with FIG. 2.

The reception component 1102 may provide means for receiving communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may provide means for transmitting communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may provide means for performing signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may provide means for transmitting a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit comprising at least one nominal repetition and at least one actual repetition; and receiving the set of physical uplink shared channel repetitions based at least in part on the transport block size. In some aspects, the communication manager 1104 may include a controller/processor, a memory, a scheduler, a communication unit, or a combination thereof, of the base station described above in connection with FIG. 2. In some aspects, the communication manager 1104 may include the reception component 1102, the transmission component 1106, and/or the like. In some aspects, the means provided by the communication manager 1104 may include, or be included within means provided by the reception component 1102, the transmission component 1104, and/or the like.

In some aspects, the communication manager 1104 and/or one or more components thereof may include or may be implemented within hardware. In some aspects, the communication manager 1104 and/or one or more components thereof may include or may be implemented within a controller/processor, a memory, or a combination thereof, of the BS 110 described above in connection with FIG. 2.

In some aspects, the communication manager 1104 and/or one or more components thereof may be implemented in code (e.g., as software or firmware stored in a memory). For example, the communication manager 1104 and/or a component (or a portion of a component) of the communication manager 1104 may be implemented as instructions or code stored in a non-transitory computer-readable medium and executable by a controller or a processor to perform the functions or operations of the communication manager 1104 and/or the component. If implemented in code, the functions of the communication manager 1104 and/or a component may be executed by a controller/processor, a memory, a scheduler, a communication unit, or a combination thereof, of the BS 110 described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:
a memory; and
one or more processors coupled to the memory, wherein the one or more processors are configured to:
determine a transport block size based at least in part on:
a set of physical uplink shared channel resources corresponding to a set of physical uplink shared channel repetitions that are configured to be transmitted over at least one repetition unit comprising at least one nominal repetition and at least one actual repetition, and
a number of nominal resource elements of at least one initial nominal repetition of the at least one nominal repetition, wherein a quantity of the at least one initial nominal repetition is less than or equal to a quantity of the at least one nominal repetition; and
transmit the set of physical uplink shared channel repetitions based at least in part on the transport block size.

2. The user equipment of claim 1, wherein the one or more processors, to determine the transport block size, are configured to determine the transport block size based at least in part on a number of actual resource elements corresponding to the at least one initial nominal repetition of the at least one nominal repetition.

3. The user equipment of claim 1, wherein the one or more processors, to determine the transport block size, are configured to determine the transport block size based at least in part on a number of actual resource elements corresponding to at least one initial actual repetition of the at least one actual repetition.

4. The user equipment of claim 1, wherein the one or more processors are further configured to multiplex uplink control information on one or more physical uplink shared channel repetitions of the set of physical uplink shared channel repetitions.

5. The user equipment of claim 4, wherein a number of resource elements occupied by uplink control information on a physical uplink shared channel is scaled up by at least one of a number of nominal repetitions or a number of actual repetitions.

6. The user equipment of claim 4, wherein the one or more processors, to multiplex the uplink control information, are configured to multiplex the uplink control information on a first actual repetition of the at least one actual repetition that satisfies a multiplexing timeline.

7. The user equipment of claim 6, wherein the one or more processors, to multiplex the uplink control information, are configured to multiplex the uplink control information on one or more additional consecutive actual repetitions of the at least one actual repetition, wherein a quantity of the first actual repetition and the one or more additional consecutive actual repetitions is equal to a quantity of the set of physical uplink shared channel repetitions.

8. The user equipment of claim 6, wherein the one or more processors, to multiplex the uplink control information, are configured to multiplex the uplink control information on one or more additional consecutive actual repetitions corresponding to the at least one nominal repetition.

9. The user equipment of claim 1, wherein the one or more processors, to transmit the set of physical uplink shared channel repetitions, are configured to transmit the set of physical uplink shared channel repetitions based at least in part on a frequency hopping pattern.

10. The user equipment of claim 9, wherein the frequency hopping pattern comprises an inter-nominal repetition frequency hop, and wherein a frequency hop length is equal to a nominal repetition count associated with the at least one repetition unit.

11. The user equipment of claim 9, wherein the frequency hopping pattern comprises an inter-nominal repetition frequency hop corresponding to a plurality of bundled slot units, wherein a frequency hop length is equal to an integer multiple of a nominal repetition count associated with the at least one repetition unit.

12. The user equipment of claim 9, wherein the frequency hopping pattern comprises an intra-nominal repetition frequency hop, and wherein a nominal repetition count associated with the at least one repetition unit is equal to an integer multiple of a frequency hop length.

13. The user equipment of claim 12, wherein the frequency hopping pattern comprises two frequency locations, and wherein the nominal repetition count is two times the frequency hop length.

14. The user equipment of claim 12, wherein the frequency hopping pattern comprises more than two frequency locations, and wherein the nominal repetition count is equal to a quantity of frequency hops in a frequency hop periodicity associated with the frequency hopping pattern.

15. The user equipment of claim 9, wherein the frequency hopping pattern comprises an inter-nominal repetition frequency hop, and wherein a first demodulation reference signal pattern corresponding to a first repetition is different than a demodulation reference signal pattern corresponding to a second repetition.

16. The user equipment of claim 15, wherein one of the first repetition and the second repetition does not include a demodulation reference signal symbol.

17. The user equipment of claim 1, wherein a mapping of encoded bits in the at least one repetition unit is continuous.

18. The user equipment of claim 17, wherein a starting bit of an initial actual repetition of the at least one repetition unit is based at least in part on a redundancy version, and wherein a starting bit of an additional actual repetition of the at least one repetition unit comprises a next bit following a last bit in an immediately prior actual repetition.

19. The user equipment of claim 1, wherein the one or more processors, to transmit the set of physical uplink shared channel repetitions, are configured to perform a two-level redundancy version cycle procedure.

20. The user equipment of claim 19, wherein the one or more processors, to perform the two-level redundancy version cycle procedure, are configured to:

cycle a first actual repetition of each repetition unit of a plurality of repetition units as an outer level, wherein the plurality of repetition units include the at least one repetition unit; and cycle a plurality of actual repetitions within the at least one repetition unit as an inner level.

21. The user equipment of claim 1, wherein the one or more processors are further configured to receive a resource allocation that indicates a frequency domain resource that is smaller than a physical resource block.

22. The user equipment of claim 21, wherein the one or more processors are further configured to modify one or more parameters associated with the set of physical uplink shared channel repetitions based at least in part on the resource allocation, the one or more parameters comprising at least one of:

a nominal repetition count associated with a transport block size determination, a nominal repetition count, or a quantity of nominal repetitions bundled in a frequency hop.

23. A network entity for wireless communication, comprising:

a memory; and one or more processors coupled to the memory, wherein and the one or more processors are configured to:

transmit a physical uplink shared channel repetition configuration comprising an indication to determine a transport block size based at least in part on:

a set of physical uplink shared channel resources corresponding to a set of physical uplink shared channel repetitions that are configured to be transmitted over at least one repetition unit comprising at least one nominal repetition and at least one actual repetition, and a number of nominal resource elements of at least one initial nominal repetition of the at least one nominal repetition, wherein a quantity of the at least one initial nominal repetition is less than or equal to a quantity of the at least one nominal repetition; and receive the set of physical uplink shared channel repetitions based at least in part on the transport block size.

24. The network entity of claim 23, wherein the determination of the transport block size is based at least in part on a number of actual resource elements corresponding to the at least one initial nominal repetition of the at least one nominal repetition.

25. The network entity of claim 23, wherein the determination of the transport block size is based at least in part on a number of actual resource elements corresponding to at least one initial actual repetition of the at least one actual repetition.

26. The network entity of claim 23, wherein the one or more processors are further configured to receive uplink control information that is multiplexed on one or more physical uplink shared channel repetitions of the set of physical uplink shared channel repetitions.

27. The network entity of claim 26, wherein a number of resource elements occupied by uplink control information on a physical uplink shared channel is scaled up by at least one of a number of nominal repetitions or a number of actual repetitions.

28. The network entity of claim 26, wherein the uplink control information is multiplexed on a first actual repetition of the at least one actual repetition that satisfies a multiplexing timeline.

29. The network entity of claim 28, wherein the uplink control information is multiplexed on one or more additional consecutive actual repetitions of the at least one actual repetition, wherein a quantity of the first actual repetition and the one or more additional consecutive actual repetitions is equal to a quantity of the set of physical uplink shared channel repetitions.

30. The network entity of claim 28, wherein the uplink control information is multiplexed on one or more additional consecutive actual repetitions corresponding to the at least one nominal repetition.

\* \* \* \* \*